United States Patent
Wang

(10) Patent No.: US 8,384,301 B2
(45) Date of Patent: *Feb. 26, 2013

(54) LIGHT SOURCE SYSTEM CAPABLE OF DISSIPATING HEAT

(75) Inventor: Chun-Chuan Wang, Taipei (TW)

(73) Assignees: AMIC Technology Corporation, Science-Based Industrial Park, Hsin-Chu (TW); Power Up, Inc., Jhubei, Hsin-chu County (TW)

( * ) Notice: Subject to any disclaimer, the term of this patent is extended or adjusted under 35 U.S.C. 154(b) by 432 days.

This patent is subject to a terminal disclaimer.

(21) Appl. No.: 12/709,514

(22) Filed: Feb. 22, 2010

(65) Prior Publication Data

US 2011/0175539 A1  Jul. 21, 2011

(30) Foreign Application Priority Data

Jan. 21, 2010 (TW) .............................. 99101628 A

(51) Int. Cl.
*H05B 41/16* (2006.01)

(52) U.S. Cl. ..... 315/287; 315/112; 315/117; 315/209 R; 315/200 R; 315/210

(58) Field of Classification Search .................. 315/152, 315/287, 209 R, 291, 294, 297, 307, 308, 315/312; 345/102, 204, 211–214, 207, 208, 345/52, 48, 46, 44, 82, 99

See application file for complete search history.

(56) References Cited

U.S. PATENT DOCUMENTS

| | | | | |
|---|---|---|---|---|
| 7,843,423 | B2 * | 11/2010 | Wang et al. | 345/102 |
| 2003/0080696 | A1 * | 5/2003 | Tang et al. | 315/291 |
| 2011/0074302 | A1 * | 3/2011 | Draper et al. | 315/224 |

* cited by examiner

*Primary Examiner* — Douglas W Owens
*Assistant Examiner* — Jonathan Cooper
(74) *Attorney, Agent, or Firm* — Winston Hsu; Scott Margo

(57) ABSTRACT

A light source system capable of dissipating heat includes a AC power supply for outputting a first power, a switch device for adjusting an output ratio of the first power according to a light setting, a light emitting device for generating a light source, and a control device for generating an active signal sequence, an heat-dissipation signal sequence and a burst signal according to lighting features of the light emitting device, and combining the active signal sequence and the heat-dissipation signal sequence, to generate a driving signal sequence, for timely outputting the driving signal sequence according to the burst signal, so as to generate the control signal.

9 Claims, 4 Drawing Sheets

LIGHT SOURCE SYSTEM CAPABLE OF DISSIPATING HEAT

BACKGROUND OF THE INVENTION

1. Field of the Invention

The present invention relates to a light source system capable of effectively dissipating heat, and more particularly, to a light source system capable of improving light degradation, and adjusting output luminance and chrominance of light.

2. Description of the Prior Art

In daily life, people need to change luminance and chrominance of light for different environments. For example, soft light is for dining, and bright but not harsh light is for reading. Therefore, for conveniently controlling light, different methods are provided in the prior art, such that users can change the luminance and chrominance of light emitted by a light-emitting device, such as a light emitting diode, via a switch. Since the luminance and chrominance of light emitted by a light-emitting device are related to amplitude, duty cycle, or total power of an input power, the above method alters amplitude, duty cycle or total power of the input power, to adjust the luminance and chrominance of light. A method of altering the duty cycle is often realized by angular modulation, such as pulse width modulation (PWM).

Please refer to FIG. 1, which is a schematic diagram of a conventional light source system 10. The light source system 10 includes a light-emitting device 100, a switch device 102 and a pulse width modulation device 104. The light-emitting device 100 can be a light emitting diode, and is utilized for generating a light source according to received power. The switch device 102 can be an on-off switch, and is utilized for receiving control signals triggered by a user and transmitting the control signals to the pulse width modulation device 104. The pulse width modulation device 104 is utilized for transforming an input signal VIN into an output signal VOUT according to signals provided by the switch device 102, and transmitting the output signal VOUT to the light-emitting device 100 to emit light. When the user needs to control luminance and chrominance of light emitted by the light-emitting device 100, the user can utilize the switch device 102 to adjust pulse width of the output signal VOUT, i.e. T1, such that the light-emitting device 100 can emit light according to requirements.

Via the pulse width modulation device 104, the user can adjust luminance and chrominance of the light generated by the light source system 10. However, a circuitry of the pulse width modulation device 104 is very complicated, resulting in high production cost which limits its applications. Besides, utilizing the waveform generated by the pulse width modulation device 104 would still have the following problems:

First is light degradation, which means that luminance of the light emitting diode degrades as operating time increases under the same driving power, is most obvious when the light emitting diode is initially activated. In other words, luminance degradation is most obvious when a light emitting diode is turned on at the first time. Therefore, although the light emitting diode has long life time, the light degradation and deterioration of fluorescent powder and packaging materials would reduce luminous flux after long-term operation. When the luminous flux decreases to a specific degree, the effective life of the light emitting diode is over, i.e. can not meet requirements of illumination or backlight applications.

Second is heating of a light emitting diode chip. Though volume of a packaged light emitting diode is not small, surface area of a light emitting diode chip in some products is often less than 1 mm$^2$. In such a situation, the operating current density is great, such that the diode is significantly heated. If the heat can not be dissipated, the chip will be damaged easily. In addition, in order to meet requirements of illumination, a plurality of light emitting diodes are cascaded, causing significant temperature rising after long-term operation. In order to dissipate heat effectively, extra heat-dissipation areas need to be added, resulting in more complexity of external structures design.

Therefore, utilizing PWM in a light dimmer would still face light degradation and overheating. Thus, there is a need of improvement.

SUMMARY OF THE INVENTION

It is therefore an objective of the present invention to provide a light source system capable of effectively dissipating heat.

The present invention discloses a light source system capable of effectively dissipating heat. The light source system includes alternating current (AC) power supply, for outputting a first power with a first cycle according to a control signal, a switch device, coupled to the AC power supply, for adjusting an output ratio of the first power in the first cycle according to a light setting, to generating a second power, a light-emitting device, coupled to the switch device, for according to the second power, generating light source, and a control device, coupled to the AC power supply, for generating the control signal. The control device includes an active signal generator, for generating an active signal sequence according to lighting features of the light emitting device, each active signal of the active signal sequence comprising a second cycle, a heat-dissipation signal generator, for generating a heat-dissipation signal sequence, each heat-dissipation signal of the heat-dissipation signal sequence comprising a third cycle, a multiplexer, coupled to the active signal generator and the heat-dissipation signal generator for combining the active signal sequence and the heat-dissipation signal sequence, to generate a driving signal sequence, each driving signal of the driving signal sequence comprising a fourth cycle equal to a sum of the second cycle and the third cycle, a burst signal generator for generating a burst signal according to the lighting features of the light emitting device, the burst signal comprising a fifth cycle longer than the fourth cycle, and a logic unit coupled to the multiplexer, the burst signal generator and the power supply for timely outputting the driving signal sequence according to the burst signal, to generate the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
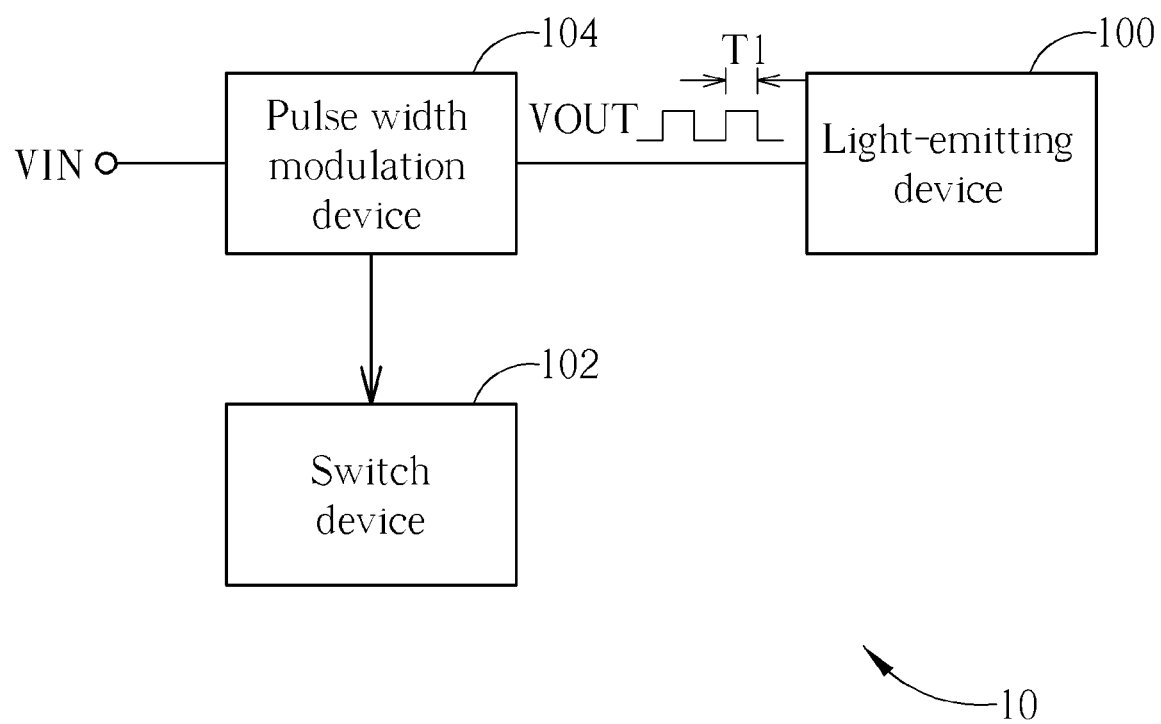
FIG. 1 is a schematic diagram of a conventional light source system.
Figure 2:
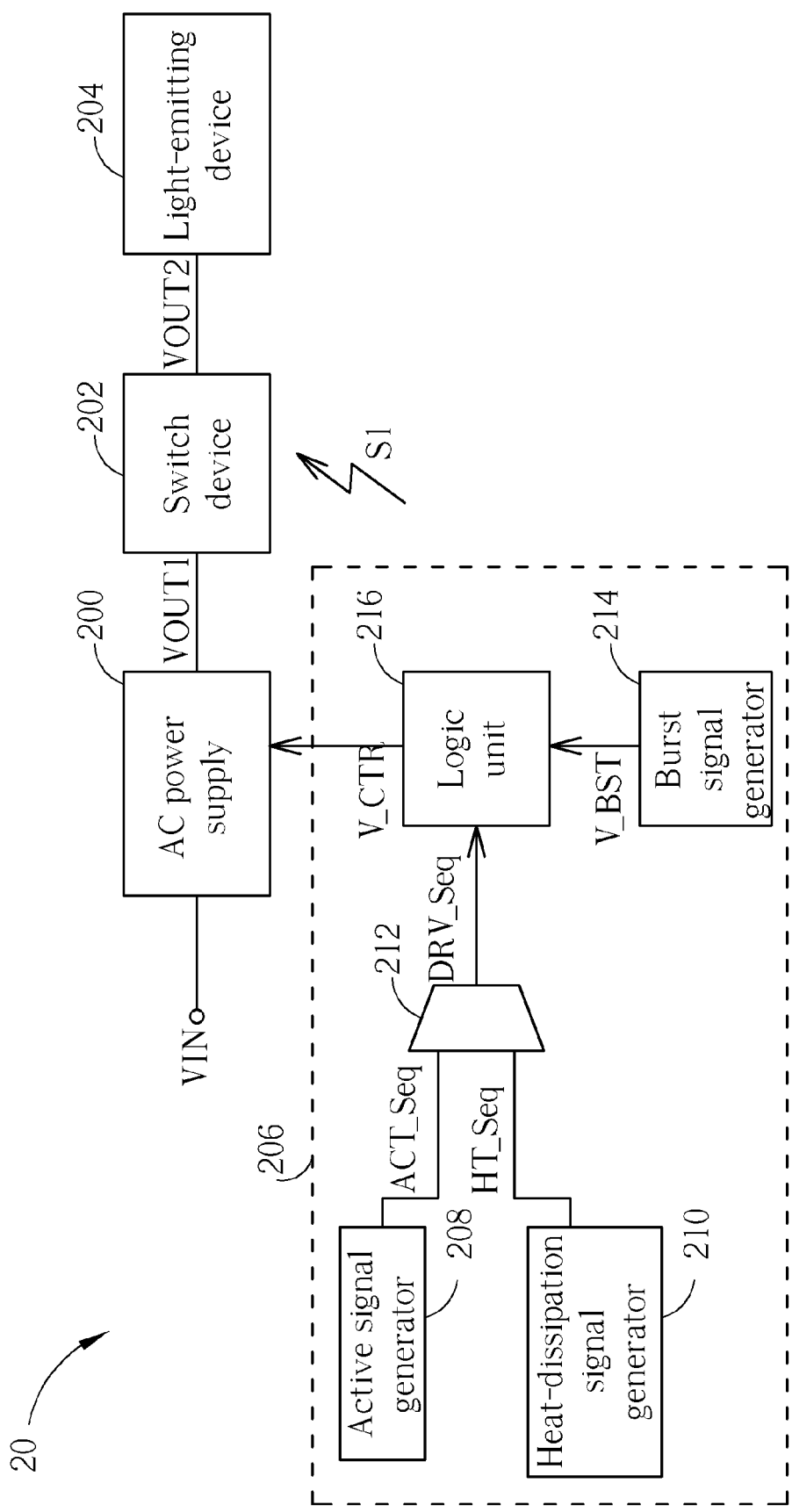
FIG. 2 is a schematic diagram of a light source system according to an embodiment of the present invention.

Please refer to FIG. 2, which is a schematic diagram of a light source system 20 according to an embodiment of the present invention. The light source system 20 includes an alternating current (AC) power supply 200, a switch device 202, a light-emitting device 204 and a control device 206. The AC power supply 200 is utilized for receiving an input power VIN, to output a first power VOUT1. Each of the input power VIN and the first power VOUT1 has a cycle V_CCL, and the input power VIN can be a normal 110 or 220 volt (V) AC power. The switch device 202 is coupled to the AC power supply 200, and is utilized for adjusting an output ratio of the first power VOUT1 in the cycle V_CCL according to a light setting S1, to generate a second power VOUT2. The light-emitting device 204 is coupled to the switch device 202, for generating light source according to the second power VOUT2. The control device 206 includes an active signal generator 208, a heat-dissipation signal generator 210, a multiplexer 212, a burst signal generator 214 and a logic unit 216. The active signal generator 208 is utilized for generating an active signal sequence ACT_Seq according to lighting features of the light emitting device 204, to activate the AC power supply 200 to output power. The active signal sequence ACT_Seq includes a plurality of active signals ACT, and each has a cycle ACT_CCL. The heat-dissipation signal generator 210 is utilized for generating a heat-dissipation signal sequence HT_Seq to control the AC power supply 200 not to output power, such that the light emitting device 204 can dissipate heat. The heat-dissipation signal sequence HT_Seq includes a plurality of heat-dissipation signals HT, and each has a cycle HT_CCL. The multiplexer 212 is coupled to the active signal generator 208 and the heat-dissipation signal generator 210, and is utilized for combining the active signal sequence ACT_Seq and the heat-dissipation signal sequence HT_Seq, so as to generate a driving signal sequence DRV_Seq. The driving signal sequence DRV_Seq includes a plurality of driving signals DRV, and each includes an active signal ACT and a heat-dissipation signal HT. In other words, a cycle DRV_CCL of the driving signal DRV is equal to a sum of the cycle ACT_CCL and the cycle HT_CCL. The burst signal generator 214 is utilized for generating a burst signal V_BST according to the lighting features of the light emitting device 204. The cycle BST_CCL of the burst signal V_BST is greater than the cycle DRV_CCL. The logic unit 216 is coupled to the multiplexer 212, the burst signal generator 214 and the AC power supply 200, and is utilized for timely outputting the driving signal sequence DRV_Seq according to the burst signal V_BST, so as to generate a control signal V_CTR to the AC power supply 200, thereby controlling magnitude and cycles of the power outputted by the AC power supply 200.

Figure 3:
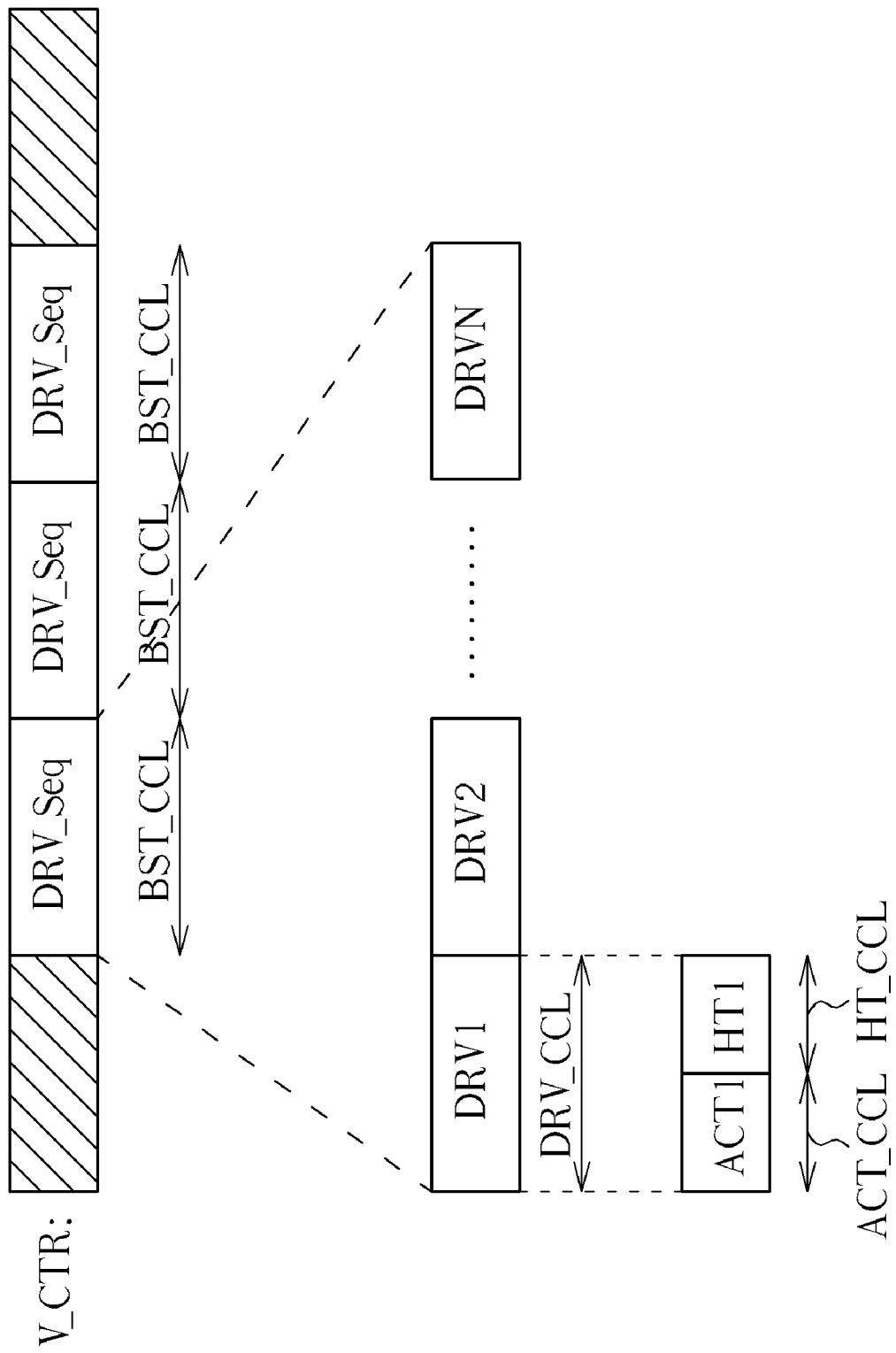
FIG. 3, which is a schematic diagram of a relation of the control signal, the driving signal sequence, the active signal and the heat-dissipation signal in FIG. 2.

As for detailed operation of the light source system 20, please refer to FIG. 3, which is a schematic diagram of a relation of the control signal V_CTR, the driving signal sequence DRV_Seq, the active signal ACT and the heat-dissipation signal HT in FIG. 2. As can be seen from FIG. 3, the burst signal V_BST is utilized for controlling output of the driving signal sequence DRV_Seq. That is, during the cycle BST_CCL, the logic unit 216 can output the driving signal sequence DRV_Seq to the AC power supply 200, and outside the cycle BST_CCL, the logic unit 216 does not output signals or outputs a low level signal to the AC power supply 200.

As a result, during the cycle BST_CCL, the AC power supply 200 can output the proper first power VOUT1 to the switch device 202 according to the level and cycle ACT_CCL of the active signal ACT of each driving signal DRV. Then, the switch device 202 determines to output the first power VOUT1 in a one-fourth, half or any ratio of cycle V_CCL, i.e. the second power VOUT2, to the light-emitting device 204 according to the light setting S1. Since the luminance and chrominance of light outputted by the light-emitting device 204 are related to the total input power, the luminance and chrominance of light outputted by the light-emitting device 204 can be adjusted accordingly. During the cycle HT_CCL of the heat-dissipation signal HT, the AC power supply 200 does not output power to the switch device 202, i.e. not output power to the light emitting device 204, so as to facilitate the light emitting device 204 to dissipate heat. Moreover, the present invention adjusts the cycles ACT_CCL, HT_CCL, BST_CCL and the level of the active signal ACT to achieve predetermined effects according to the lighting features of the light emitting device 204, such as luminance and chrominance. Certainly, the logic unit 216 can be designed not to output signals or output a low level signal to the AC power supply 200 during the cycle BST_CCL, and output the driving signal sequence DRV_Seq to the AC power supply 200 outside the cycle BST_CCL. In such a situation, outside the cycle BST_CCL, the AC power supply 200 can output the proper first power VOUT1 to the switch device 202 according to the level and cycle ACT_CCL of the active signal ACT of each driving signal DRV. Then, the switch device 202 determines to output the first power VOUT1 in a one-fourth, half or any ratio of cycle V_CCL, i.e. the second power VOUT2, to the light-emitting device 204 according to the light setting S1. Since the luminance and chrominance of light outputted by the light-emitting device 204 are related to the total input power, the luminance and chrominance of light outputted by the light-emitting device 204 can be adjusted accordingly. During the cycle HT_CCL of the heat-dissipation signal HT, the AC power supply 200 does not output power to the switch device 202, i.e. not output power to the light emitting device 204, so as to facilitate the light emitting device 204 to dissipate heat.

Figures 4A, 4B:
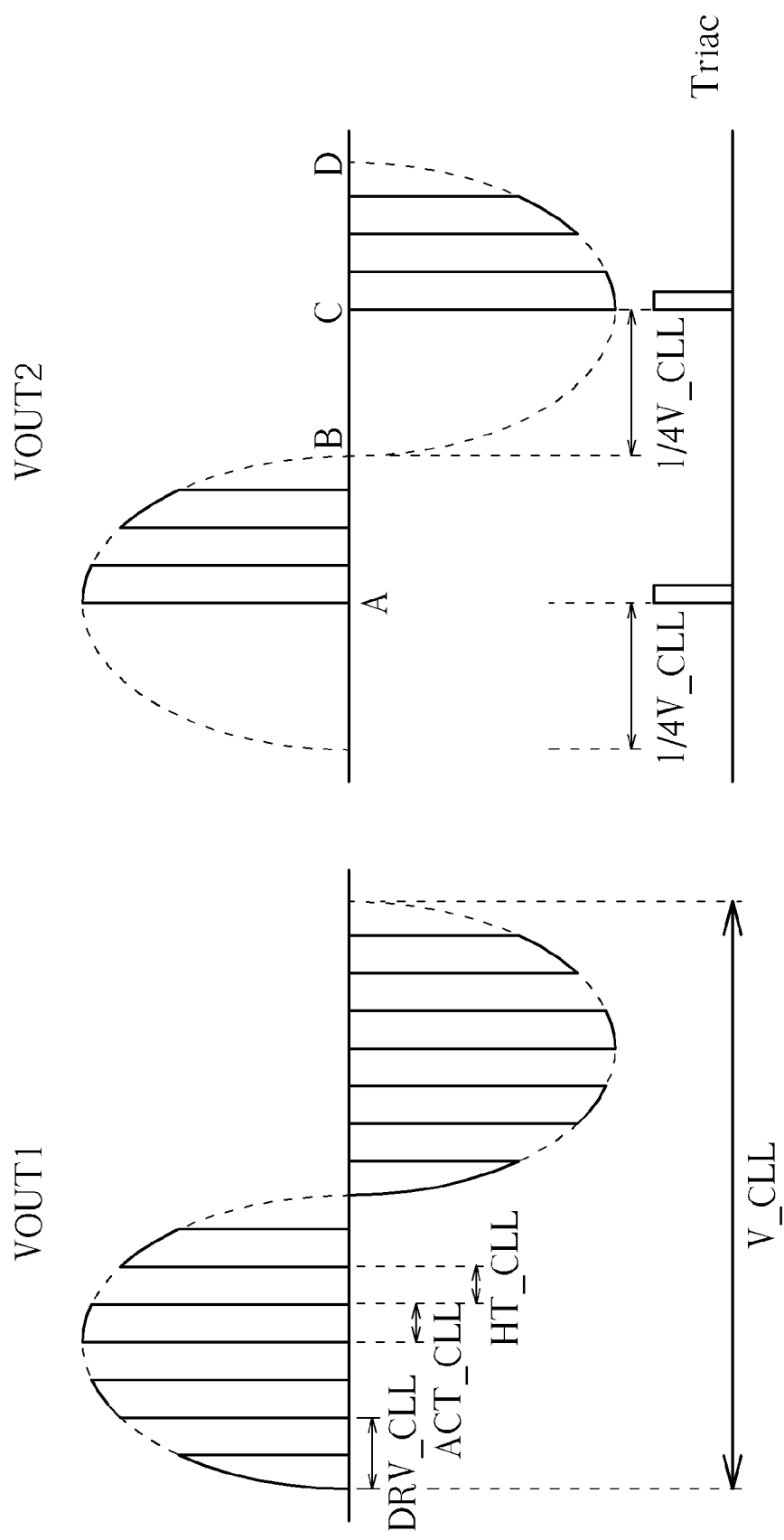
FIG. 4A and FIG. 4B which are schematic diagrams of waveforms of the first power and the second power when the light setting indicates the luminance and chrominance of light source as a half of the maximum luminance and chrominance of light source.

For example, please refer to FIG. 4A and FIG. 4B, which are schematic diagrams of waveforms of the first power VOUT1 and the second power VOUT2 when the light setting S1 indicates the luminance and chrominance of light source as a half of the maximum luminance and chrominance of light source. FIG. 4A is the waveform of the first power VOUT1 outputted by the AC power supply 200 according to the level and cycle ACT_CCL of the active signal ACT of each driving signal DRV. FIG. 4B is the waveform of the second power VOUT2 when the switch device 202 outputs the first power VOUT1 in a half of cycle V_CCL according to the light setting S1 during the cycle BST_CCL. As shown in FIG. 4A and FIG. 4B, during the cycle BST_CCL, the AC power supply 200 can output a proper first power VOUT1 to the switch device 202 according to the level and cycle ACT_CCL of the active signal ACT of each driving signal DRV. Then, the switch device 202 outputs the first power VOUT1 in a half of cycle V_CCL, i.e. the second power VOUT2, to the light-emitting device 204 according to the light setting S1. During the cycle HT_CCL of the heat-dissipation signal HT, the AC power supply 200 does not output power to the switch device 202, i.e. not output power to the light emitting device 204, so as to facilitate the light emitting device 204 to dissipate heat. In addition, the switch device 202 utilizes a Triode Alternating Current (triac) to adjust the output ratio in the cycle V_CCL for the first power VOUT1, to adjust the luminance and chrominance of light outputted by the light-emitting device 204.

In detail, when the triac is conducted, i.e. time A, this conduction state will continue until a zero-crossing point, i.e. time B. Under such a state, the first power VOUT1 can be passed through the switch device 202. Similarly, when the triac is conducted, i.e. time C, this conduction state will continue until another zero-crossing point, i.e. time D. Under such a state, the first power VOUT1 can be passed through the switch device 202. Since triac is a bidirectional element, the switch device 202 only needs to use one triac to adjust the output ratio of the first power VOUT1 in the cycle V_CCL according to light setting S1, so as to adjust the luminance and chrominance of light outputted by the light-emitting device 204. In comparison, adjustments of the luminance and chrominance of light are usually implemented by different switches in the prior art, and circuits thereof, e.g. pulse width modulation (PWM) circuits, are more complicated as well.

As known by those skilled in the art, a feature of human eyes is similar to a low pass filter. That is, human eyes are insensitive to rapid changes of luminance and chrominance. The present invention utilizes this feature to present the heat-dissipation signals HT and the active signals ACT alternately. When the active signal ACT is presented, the AC power supply 200 outputs driving power and the light emitting device 204 emits light after the switch device 202 outputs the first power in a ratio of the cycle V_CCL. When the heat-dissipation signal HT is presented, the AC power supply 200 does not output driving power and the light emitting device 204 does not emit light, so as to dissipate heat. In such a situation, since human eyes are insensitive to rapid changes of luminance and chrominance, the luminance and chrominance of light source outputted by the light emitting device 204 are only related to a ratio of the cycle V_CCL for human eyes when the switch device 202 outputs the first power VOUT1. In other words, the added heat-dissipation signals HT does not affect the luminance and chrominance of light source outputted by the light emitting device 204. More importantly, via the heat-dissipation signals HT, the light emitting device 204 can effectively dissipate heat, and improve light degradation and further extend the effective life of the light emitting device 204 because time of continuous operation of the light emitting device 204 is reduced.

Noticeably, the above description is only utilized for illustrating the present invention and those skilled in the art can make alternations and modifications accordingly. For example, the bidirectional triac of the switch device 202 can be replaced by two unidirectional thyristors, to adjust the luminance and chrominance of light. The light setting S1 is not limited to indicate the luminance and chrominance of light source as a half of the maximum luminance and chrominance of light source, and can set other ratio as well, as long as the switch device 202 can accordingly adjust the output ratio in the cycle V_CCL for the first power VOUT1, such that the light-emitting device 204 can emit light source.

To sum up, the present invention presents the heat-dissipation signals HT and the active signals ACT alternately in the driving signal sequence DRV_Seq, such that when the heat-dissipation signal HT is presented, the AC power supply 200 does not output driving power, so as to dissipate heat. Since human eyes are insensitive to rapid changes of luminance and chrominance, the luminance and chrominance of light source outputted by the light emitting device 204 are only related to a ratio of the cycle V_CCL when the switch device 202 outputs the first power VOUT1. More importantly, via the heat-dissipation signals HT, the light emitting device 204 can effectively dissipate heat, and improve light degradation and further extend the effective life of the light emitting device 204 because time of continuous operation of the light emitting device 204 is reduced.

Those skilled in the art will readily observe that numerous modifications and alterations of the device and method may be made while retaining the teachings of the invention.

What is claimed is:

1. A light source system capable of effectively dissipating heat comprising:
    an alternating current (AC) power supply, for outputting a first power with a first cycle according to a control signal;
    a switch device, coupled to the AC power supply, for adjusting an output ratio of the first power in the first cycle according to an light setting, to generating a second power;
    a light-emitting device, coupled to the switch device, for according to the second power, generating light source; and
    a control device, coupled to the AC power supply, for generating the control signal, comprising:
        an active signal generator, for generating an active signal sequence according to lighting features of the light emitting device, each active signal of the active signal sequence comprising a second cycle;
        a heat-dissipation signal generator, for generating a heat-dissipation signal sequence, each heat-dissipation signal of the heat-dissipation signal sequence comprising a third cycle;
        a multiplexer, coupled to the active signal generator and the heat-dissipation signal generator for combining the active signal sequence and the heat-dissipation signal sequence, to generate a driving signal sequence, each driving signal of the driving signal sequence comprising a fourth cycle equal to a sum of the second cycle and the third cycle;
        a burst signal generator for generating a burst signal according to the lighting features of the light emitting device, the burst signal comprising a fifth cycle longer than the fourth cycle; and
        a logic unit coupled to the multiplexer, the burst signal generator and the power supply for timely outputting the driving signal sequence according to the burst signal, to generate the control signal.

2. The light source system of claim 1, wherein the switch device utilizes two thyristors to adjust the output ratio of the first power in the first cycle.

3. The light source system of claim 1, wherein the switch device utilizes a Triode Alternating Current (triac) to adjust the output ratio of the first power in the first cycle.

4. The light source system of claim 1, wherein the control signal is a combination of the driving signal sequence and a low level signal.

5. The light source system of claim 4, wherein the logic unit is utilized for outputting the driving signal sequence when the burst signal is at a first level, and outputting the low level signal when the burst signal is at a second level, to generate the control signal.

6. The light source system of claim 4, wherein the AC power supply is utilized for outputting power to the switch device during an active signal of the driving signal sequence, and not outputting power to the switch device during a heat-dissipation signal of the driving signal sequence according to the control signal.

7. The light source system of claim 1, wherein the lighting features of the light emitting device are predetermined luminance of the light emitting device.

8. The light source system of claim 1, wherein the lighting features of the light emitting device are predetermined chrominance of the light emitting device.

9. The light source system of claim 1, wherein the light emitting device is a light emitting diode.

* * * * *